(No Model.)

O. L. GILBERT.
CAR COUPLING.

No. 434,332.  Patented Aug. 12, 1890.

Witnesses
Henry Foss
Wm Jaeger

Inventor:
Oscar Louis Gilbert

UNITED STATES PATENT OFFICE.

OSCAR LOUIS GILBERT, OF ST. PAUL, MINNESOTA.

CAR-COUPLING.

SPECIFICATION forming part of Letters Patent No. 434,332, dated August 12, 1890.

Application filed March 13, 1890. Serial No. 343,808. (No model.)

*To all whom it may concern:*

Be it known that I, OSCAR LOUIS GILBERT, a citizen of the United States, residing at St. Paul, in the county of Ramsey and State of Minnesota, have invented a new and useful Automatic Car Coupling and Uncoupling, of which the following is a specification.

My invention relates to improvements in coupling and uncoupling railroad-cars; and the object of my improvements is to employ the automatic motion in the coupling and uncoupling of cars by means of the coupling-pin, axle, link, cross piece, and attachments. The axle is run through the upper part of the draw-bar. The length of the projection of the axle from the bar can be determined after experiment and proper test having been made. The upper end of the coupling-pin is fastened inside the draw-bar to said axle. The other end of the pin is thus resting in the bottom of the bar, which is here hollowed. Upon the cars coming together the link will run in the draw-bar, pushing the pin up sufficiently to admit of the link passing, after which the pin will drop back, thereby securing the coupling. This mechanism also has the advantage of uncoupling the cars by means of a chain, to which is attached a weight. This chain is fastened to one end of a cross-piece, which is fastened in the center to the axle outside of the draw-bar, the axle being here square. The other end of the cross-piece has a hook. By placing the chain with weight attached on this hook I attain an automatic uncoupling, in that the weight turns the axle and the pin connected therewith, thereby turning the coupling-pin to a horizontal position and leaving the draw-bar open and the link free. I attain this object by the mechanism illustrated in the accompanying drawings, in which—

Figure 1:
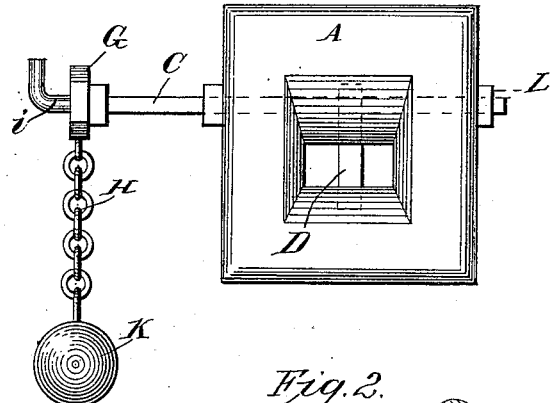
Figure 4:
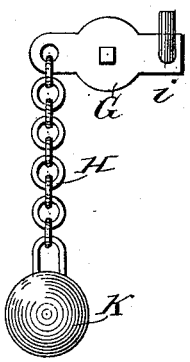
Figure 2:
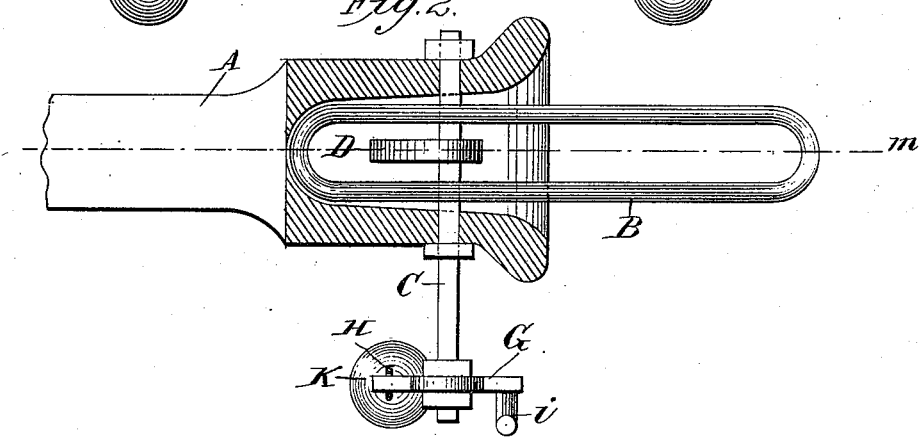
Figure 3:
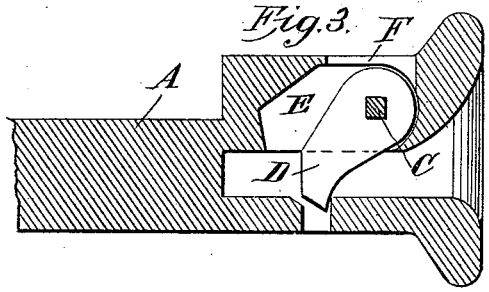

Figure 1 is a front view of the mechanism, with pin D ready for coupling. Fig. 2 is a top view of the mechanism inside the draw-bar from cut L on Fig. 1, showing also link B and pin when coupled. Fig. 3 is a side view of a part from cut M on Fig. 2, showing the form and position of pin D ready for coupling. Fig. 4 is a front view of cross-piece G and hold on the axle C, with chain and weight attached.

Similar letters refer to similar parts throughout the several views.

A A A refer to the draw-bars.

B illustrates the link coupled to one bar. (See Fig. 2.)

C C C show the axle going through the draw-bar, as specified above.

D D D refer to the coupling-pin, which is fastened to axle C.

E shows the space provided for the coupling-pin.

F represents a hole on top of the draw-bar for the purpose of putting the pin through. This is done for the convenience of the manufacturer, if so desired.

G G G refer to the cross-piece fastened to the end of axle C outside of draw-bar. To one end of this cross-piece, as shown in Figs. 1, 2, and 4, is attached chain H, provided with weight K.

H H H show the chain connected with the cross-piece G, and to the end of which is attached the weight marked K.

I I I refer to the hook on one end of cross-piece G. This hook serves the purpose for uncoupling when the chain with weight attached is placed there.

K K K show the weight attached to chain H.

What I claim, broadly, as my invention, and desire to secure by Letters Patent, is—

In a car-coupling, the axle C, provided within the draw-head with the pin D and at one end thereof with the cross-piece G, having the chain and weight and the hook I, all substantially as described.

OSCAR LOUIS GILBERT.

Witnesses:
HENRY FOSS,
HANS L. IHLE.